(12) United States Patent
Kautz et al.

(10) Patent No.: US 10,698,071 B2
(45) Date of Patent: Jun. 30, 2020

(54) METHOD FOR CALCULATING A POSITION OF AN OBJECT OF INTEREST

(71) Applicants: Swiss Timing Ltd, Corgemont (CH); Friedrich-Alexander-Universitaet Erlangen-Nuernberg, Erlangen (DE)

(72) Inventors: Thomas Kautz, Sangerhausen (DE); Sebastian Scholz, Leipzig (DE); Bjoern Eskofier, Erlangen (DE)

(73) Assignees: Swiss Timing Ltd, Corgemont (CH); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 113 days.

(21) Appl. No.: 15/780,819

(22) PCT Filed: Dec. 2, 2016

(86) PCT No.: PCT/EP2016/079614
§ 371 (c)(1),
(2) Date: Jun. 1, 2018

(87) PCT Pub. No.: WO2017/093496
PCT Pub. Date: Jun. 8, 2017

(65) Prior Publication Data
US 2018/0341004 A1 Nov. 29, 2018

(30) Foreign Application Priority Data
Dec. 3, 2015 (EP) .................................... 15197891

(51) Int. Cl.
*G01S 5/02* (2010.01)
*G01S 19/19* (2010.01)
(Continued)

(52) U.S. Cl.
CPC .............. *G01S 5/02* (2013.01); *G01S 19/19* (2013.01); *H04L 67/18* (2013.01); *H04W 4/025* (2013.01);
(Continued)

(58) Field of Classification Search
CPC ........ G01S 5/02; G01S 5/0215; G01S 5/0278; G01S 5/0294; G01S 19/19; G01S 19/45; H04L 67/18; H04W 4/025
(Continued)

(56) References Cited

U.S. PATENT DOCUMENTS 5,365,516 A * 11/1994 Jandrell ............... G01S 5/0009
340/991
5,977,913 A * 11/1999 Christ .................. G01C 21/206
340/524
(Continued)

OTHER PUBLICATIONS

International Search Report dated Feb. 27, 2017 in PCT/EP2016/079614 filed Dec. 2, 2016.

*Primary Examiner* — Dao L Phan
(74) *Attorney, Agent, or Firm* — Oblon, McClelland, Maier & Neustadt, L.L.P.

(57) ABSTRACT

A method for calculating a position of an object of interest in an environment. The method includes: predicting a position and an orientation of the object of interest in the environment; selecting a subset of base stations among a set of base stations located within the environment, by using the predicted position and orientation, and a radiation pattern of a system including the object of interest and a mobile transponder attached to the object of interest; and calculating an actual position of the object of interest, using time of arrival or time difference of arrival measurements between the base stations of the subset and the mobile transponder.

7 Claims, 1 Drawing Sheet

(51) Int. Cl.
*H04W 4/02* (2018.01)
*H04L 29/08* (2006.01)

(52) U.S. Cl.
CPC .......... *G01S 5/0215* (2013.01); *G01S 5/0263* (2013.01); *G01S 5/0294* (2013.01)

(58) Field of Classification Search
USPC .................................................. 342/357.28
See application file for complete search history.

(56) References Cited

U.S. PATENT DOCUMENTS

| | | |
|---|---|---|
| 8,164,514 B1 | 4/2012 | Yang et al. |
| 2004/0104845 A1 | 6/2004 | McCarthy |
| 2006/0034348 A1* | 2/2006 | Schaefer ................ H04B 1/707 375/130 |
| 2011/0074635 A1 | 3/2011 | Yeo et al. |

* cited by examiner

METHOD FOR CALCULATING A POSITION OF AN OBJECT OF INTEREST

CROSS-REFERENCE TO RELATED APPLICATIONS

This is a National phase Application in the United States of International Patent Application PCT/EP2016/079614 of Dec. 2, 2016 which claims priority of European patent application No. 15197891.3 of Dec. 3, 2015. The entire disclosure of the above patent applications are hereby incorporated by reference.

FIELD OF THE INVENTION

The invention relates to a method for calculating a position of an object of interest in a predefined environment, for instance the position of an athlete on a running track, a race car on a circuit, or a player on a soccer field.

BACKGROUND OF THE INVENTION

In recent years, there has been an increasing demand for reliable and objective evaluation of sport specific data. The measurement and analysis of the trajectories of athletes is one possible approach to gain such insights. It allows the assessment of the physical performance and tactical behavior of athletes. Thus, it can yield helpful feedback for athletes, coaches and referees. Furthermore, spectators can be supplied with additional information about the accomplishments of their idols.

Local Positioning Systems provide a means for the measurement of athletes positions and motion trajectories. State-of-the-art systems use time-of-arrival or time-difference-of-arrival measurements of electromagnetic waves. These electromagnetic waves travel between base stations with fixed and known positions and mobile transponders with unknown and variable positions. When such a mobile transponder is attached to an object or person, the position of this object or person can be determined from the position of the mobile transponder.

Using the time measurements from several base stations with respect to the mobile transponder, the position of the mobile transponder in the coordinate system of the local positioning system can be determined. Although such systems can offer accurate position data under ideal measurement conditions, they often suffer from deficient behavior when used at a real sports venue.

One of the most relevant sources of positioning inaccuracies is the occurrence of multipath and non-line-of-sight (NLOS) errors. NLOS errors occur when the signal between a base station and a mobile transponder is not received via the direct path but via a reflection. This leads to an erroneous time measurement and thus to an erroneous calculated position. The magnitude of NLOS errors is theoretically unlimited. Multipath errors occur when NLOS signals interfere with the line-of-sight (LOS) signal which also leads to erroneous measurements.

To determine the position of a mobile transponder, measurements from several base stations are necessary. However if the measurement of only a single base station is corrupted by a NLOS or multipath error, considerable errors in the calculated position may occur.

SUMMARY OF THE INVENTION

It is an object of the invention to overcome these drawbacks in proposing a method for calculating a position of an object of interest whose accuracy is enhanced.

Hence, the invention relates to a method for calculating a position of an object of interest in an environment, the method comprising the steps of:
predicting a position and an orientation of the object of interest in the environment;
selecting a subset of base stations among a set of base stations located within the environment, by using the predicted position and orientation, and a radiation pattern of a system comprising the object of interest and a mobile transponder attached to the object of interest; and
calculating an actual position of the object of interest, using time of arrival or time difference of arrival measurements between the base stations of the subset and the mobile transponder.

The predicted position and orientation of the object of interest, and the knowledge of the radiation pattern of the system "mobile transponder/object of interest", enable the selection of base stations that can potentially receive a line-of-sight signal from the mobile transponder attached to the object of interest. By way of example, if a mobile transponder has a spherically symmetric radiation pattern, the object of interest may shield signals emitted by the mobile transponder. As a result, the radiation pattern of the system comprising the mobile transponder and the object of interest may not be spherical anymore. The resulting radiation pattern may have the shape of an hemisphere, for instance. Thus, depending of the position and the orientation of the object of interest, some base stations cannot receive line-of-sight signals from the mobile transponder. To avoid NLOS and multipath errors, these base stations should not be used to calculate the position of the object of interest via time of arrival or time difference of arrival measurements. For this reason, in the method according to the invention, only measurements of base stations that can potentially receive line-of-sight signals from the mobile transponder are selected to be used in the position calculation.

With this approach, some base stations may be excluded from the measurement a priori, thereby not only reducing NLOS and multipath errors, but also decreasing computational cost.

The step of selecting comprises determining whether the base stations of the set could receive line-of-sight signals from the mobile transponder if the object of interest had the predicted position and orientation in the environment.

The base stations that could receive line-of-sight signals if the object of interest had the predicted position and orientation in the environment are selected, so that their time of arrival or time difference of arrival measurements are used in the position calculation. The other base stations of the set are excluded from the selection, then also from the calculation.

Furthermore, the method according to the invention may comprise one or a combination of the following characteristics.

According to a not limited embodiment, the determining comprises assessing a position of at least one other object of the environment, called neighbouring object.

Even if the predicted position and orientation and the radiation pattern of the system "mobile transponder/object of interest" enable some base stations to receive line-of-sight signals from the mobile transponder, neighbouring objects may be situated between the object of interest and said base stations, preventing transmission of line-of-sight signals. Calculating or measuring the position of neighbouring objects enables excluding these base stations from the position calculation.

According to a not limited embodiment, the step of selecting comprises, for a given signal transmitted by the mobile transponder:

estimating signal strengths expected at the base stations of the set, if the object of interest had the predicted position and orientation, and comparing measured signal strengths at the base stations of the set with the estimated signal strengths.

The predicted position and orientation of the object of interest, as well as the knowledge of the radiation pattern of the system "mobile transponder/object of interest", enable predicting signal strengths expected at each base station. By comparing said expected strengths with measured strengths, base stations for which the signal strength deviates considerably from the predicted value can be excluded from the position calculation.

According to a not limited embodiment, the prediction of the position is performed by using a previous position of the object of interest in the environment. Advantageously, the previous position is the most recent position of the object of interest that has been calculated, measured or provided to the base stations.

Using the previous position, a suitable motion model and possibly additional data, for example the speed of the object of interest, a current position of the object of interest can be calculated.

According to a not limited embodiment, the object of interest is moving along a predefined path, and the prediction of the orientation is performed by using geographical features of the path, a previous position of the object of interest on the path, and a direction of the object of interest along the path.

The predefined path may be an athletics running track or a horse racing track, for instance. In this case, the orientation of the object of interest may be approximated as the orientation of the tangent of the path at the predicted position.

According to a not limited embodiment, the predictions of the position and orientation are performed by using of a motion model and a previous position and orientation of the object of interest in the environment.

The state of the object of interest may be modelled with a suitable motion model, for instance in terms of its position, orientation, and other variables such as its speed, acceleration, etc. Using the motion model, a current state of the object of interest may be predicted from its state at a previous time. The motion model may be used in combination with a probabilistic filter, such a Kalman Filter.

According to a not limited embodiment, the prediction of the orientation is performed by using inertial and magnetic measurements.

This approach is particularly suitable for highly dynamic orientation changes, as for example in game sports. Changes in orientation may be monitored by gyroscopic measurements. In addition, magnetometer and accelerometer measurements may be used to reduce drift errors of the gyroscopic data.

BRIEF DESCRIPTION OF THE DRAWINGS

Other features and advantages of the present invention will appear more clearly upon reading the following detailed description, made with reference to the annexed drawings, given by way of non-limiting and in with.

DETAILED DESCRIPTION OF THE PREFERRED EMBODIMENTS

Figure 1:
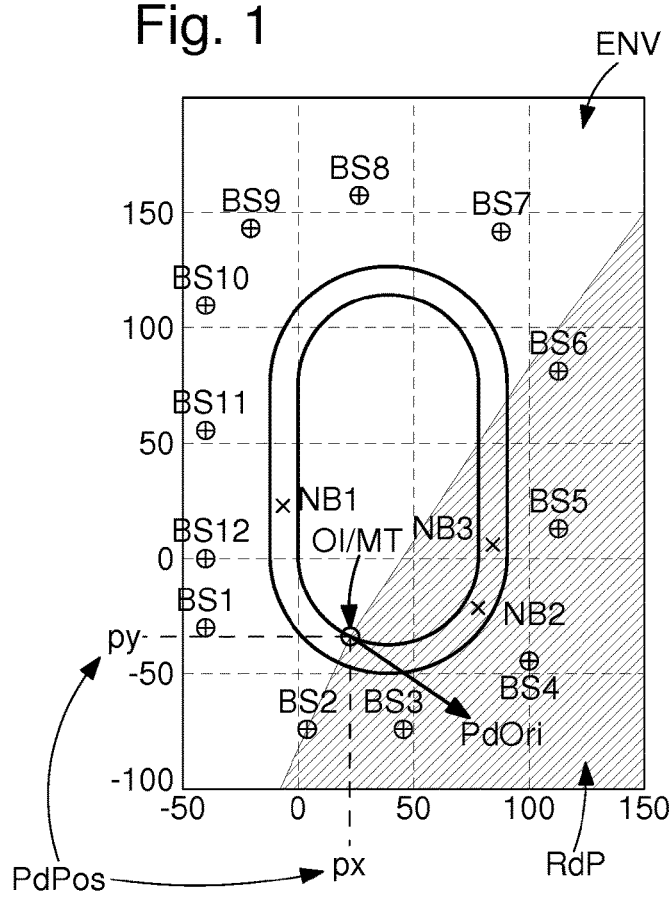
FIG. 1 shows an environment comprising a set of base stations, an object of interest whose position is to be determined and neighbouring objects, said base stations being adapted to calculate positions of said object of interest via time of arrival or time difference of arrival measurements.

FIG. 1 shows an environment ENV comprising a set of base stations BS1-BS12 whose positions are assumed to be known. The base stations BS1-BS12 may be immobile for instance. The base stations BS1-BS12 constitute a local positioning system configured to calculate positions of transponders via time-of-arrival or time-difference-of-arrival measurements.

The environment ENV also comprises an object of interest OI whose position is to be determined, and other objects, called neighbouring objects NB1, NB2, NB3. On the example illustrated on FIG. 1, the objects OI, NB1, NB2, NB3 are athletes on a running track. It should be noted that the object of interest OI does not necessarily move along a predefined path as a running track. For instance, the object of interest may move in any possible direction, as on a field of play. A mobile transponder MT, configured to send signals according to a radiation pattern, is rigidly attached to the object of interest OI. By way of example, if the object of interest OI is an athlete, the mobile transponder MT may be attached to their chest. Depending on its geometric arrangement with the mobile transponder MT, the object of interest OI may occlude a part of the radiation pattern of the mobile transponder MT, thereby influencing the signals emitted by the mobile transponder MT. In the example shown on FIG. 1, the radiation pattern of the mobile transponder MT is spherical, but the object of interest OI shields almost half of it: as a consequence, the radiation pattern RdP of the system OI/MT comprising the mobile transponder MT and the object of interest OI has roughly the shape of an hemisphere. In fact, the mobile transponder MT and the object of interest OI are modelled as one rigid body, which may be subject to translation and/or rotation. With this assumption, the combined radiation pattern RdP of the system OI/MT is constant with respect to the mobile transponder MT.

Figure 2:
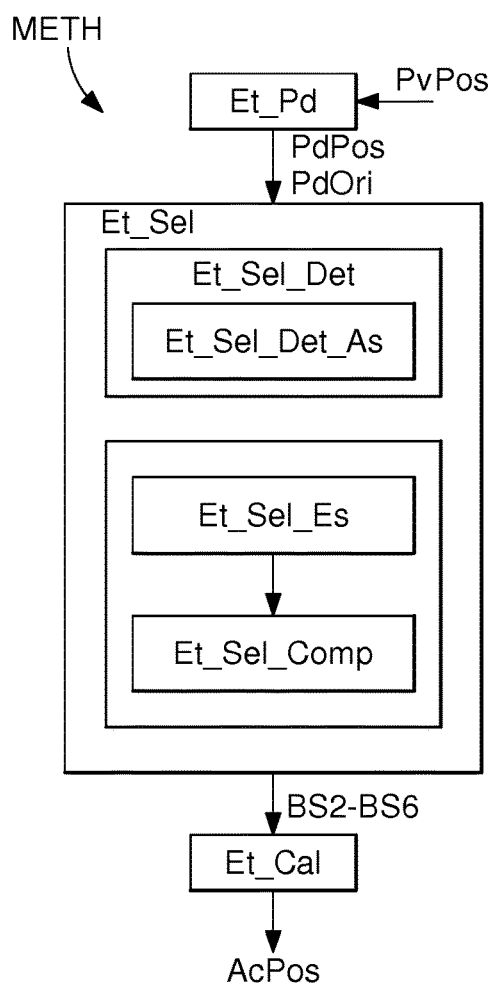
FIG. 2 shows a flow diagram illustrating a method for calculating a position of the object of interest by means of the base stations, according to a non-limited embodiment of the invention.

Steps of a method METH for calculating the position of the object of interest OI in the environment ENV are illustrated on FIG. 2.

The method METH comprises a step of predicting Et_Pd a position PdPos and an orientation PdOri of the object of interest OI in the environment ENV.

The prediction of the position PdPos may be performed by using at least one last measured position(s) PvPos of the object of interest OI, a suitable motion model and a probabilistic filter, such as the Kalman Filter. Kalman filtering is an algorithm that uses a series of measurements observed over time, containing statistical noise and other inaccuracies, and produces estimates of unknown variables that tend to be more precise than those based on a single measurement alone.

Other ways of predicting the position PdPos include:

using inertial measurements to estimate the displacement of the object of interest OI; and assuming that the object of interest OI is static, that is to say that the predicted position PdPos is the same as the last measured position PvPos.

This assumption may be justified if the sampling rate of the system is high enough, which implies the timespan for the prediction is small enough.

In an embodiment, the prediction of the orientation PdOri is based on a priori knowledge of the movement. In this embodiment, the object of interest OI must move along a predefined path in a given direction, as for instance in athletics or horse racing. Since the coordinates and shape of the path, as well as the direction of the object of interest OI along the path are known a priori, the orientation of the system OI/MT can be inferred from the predicted position PdPos of the object of interest OI.

For instance, the orientation of the system OI/MT may be approximated as the orientation of the tangent of the path at the predicted position PdPos. For simple path geometries, this tangent can be calculated analytically by decomposing the track shape into geometric primitives. If calculation in closed form is not possible, the path can be approximated by a sufficient high number of straights whose orientation is known. These orientations can for example be stored in a lookup table. The assumed orientation PdOri of the system OI/MT is then the orientation of the closest track segment with respect to the predicted position PdPos of the system OI/MT.

In another embodiment, the prediction of the orientation is performed by using a state and a motion model, a probabilistic filter and a previous position PvPos and orientation PvOri of the object of interest OI in the predefined environment ENV. The probabilistic filter may be a Kalman Filter or a similar filter, such as a particle filter. The state of the object of interest OI may for example be modeled in terms of its current position (px, py) in a coordinate system (x, y), translational speed v, acceleration a, orientation ϕ and turning rate ω. By way of example, if the object of interest OI has a constant acceleration and a constant turning rate, the state of the object of interest OI at a time k+1 may be predicted from its state at a time k using the following motion model:

$$\begin{bmatrix} p_{x,k+1} \\ p_{y,k+1} \\ v_{k+1} \\ a_{k+1} \\ \phi_{k+1} \\ \omega_{k+1} \end{bmatrix} = \begin{bmatrix} p_{x,k} + T_k(v_k + a_k T_k)\cos(\phi_k + \omega_k T_k) \\ p_{y,k} + T_k(v_k + a_k T_k)\sin(\phi_k + \omega_k T_k) \\ v_k + a_k T_k \\ a_k \\ \phi_k + \omega_k T_k \\ \omega_k \end{bmatrix}$$

Hereabove, $T_k$ is the sampling time, i.e. the duration between time k and time k+1.

This prediction is then combined with the next position measurement and the estimated state is updated with the new information. In this process, all elements of the state vector (including the orientation) may be estimated. Of course, other motion models which include the orientation of the object of interest OI may be applicable.

In another embodiment, the prediction of the orientation is performed by using inertial and magnetic measurements such as accelerometers and gyroscopes. Inertial and magnetic measurements may be used for an accurate and a dynamic orientation determination. Changes of the orientation may be monitored by integration of gyroscopic measurements. In addition, magnetometer and accelerometer readings may be used to reduce drift errors of the gyroscope data and to improve the accuracy of the orientation determination.

Furthermore, the method METH comprises a step of selecting Et_Sel a subset of base stations BS2-BS6 among the set of base stations BS1-BS12, by using the predicted position PdPos and orientation PdOri, and the radiation pattern RdP of the system OI/MT.

In an embodiment, the step of selecting Et_Sel may comprise a step of determining Et_Sel_Det whether the base stations of the set BS1-BS12 could receive line-of-sight signals from the mobile transponder MT if the object of interest OI had the predicted position PdPos and orientation PdOri in the environment ENV. This approach is based on the assessment that if a base station that is occluded by the object of interest OI from the mobile transponder MT receives a signal of the mobile transponder MT, this signal must be a non-line-of-sight signal and should not be used for determining the position of the mobile transponder MT. On the example illustrated on FIG. 1, only base stations BS2-BS6 are expected to receive a line-of-sight signal, or at least a sufficiently strong line-of-sight signal, from the mobile transponder MT. Due to the predicted position PdPos and orientation PdOri of the object of interest OI, it is assumed that the other base stations BS1-BS5 and BS7-BS12 can only receive non-line-of-sight signals.

Figure 3:
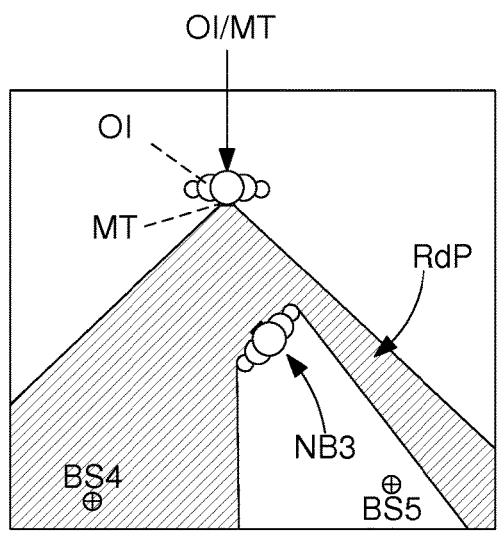
FIG. 3 shows the object of interest and a neighbouring object occluding a base station.

In addition, the step of determining Et_Sel_Det may comprise a step of assessing Et_Sel_Det_As a position of the neighbouring objects NB1, NB2, NB3, so as to take into account the changing environment of the object of interest OI. In fact, neighbouring objects NB1, NB2, NB3 may move into the signal path between the mobile transponder MT and the base stations BS1-BS12, thereby occluding the line-of-sight signal. Such a situation is shown on FIG. 3, for instance. In the example shown on FIG. 3, a neighbouring object NB3 is located in the path between the mobile transponder MT and the fifth base station BS5, thereby occluding said fifth base station BS5. As a consequence, no line-of-sight exists between the mobile transponder MT and the fifth base station BS5.

Alternately or in addition, the step of selecting Et_Sel may comprise the following steps, for a given signal transmitted by the mobile transponder MT:

estimating Et_Sel_Es signal strengths expected at the base stations BS1-BS12, if the object of interest OI had the predicted position PdPos and orientation PdOri, and comparing Et_Sel_Comp measured signal strengths at the base stations BS1-BS12 with the estimated signal strengths.

Predicting the expected signal strengths at each base stations BS1-BS12 and comparing them with the actual signal strengths enable to detect the base stations for which the signal strength deviates considerably from the predicted value. These base stations may then be excluded from the selection.

When the geometry, position and orientation of the neighbouring objects BS1-BS12 in the environment ENV are known, it is possible to determine which base stations can receive valid signals from the mobile transponder MT and which cannot. Thereby, non-line-of-sight errors can be excluded more reliably. The position of the neighbouring objects NB1, NB2, NB3 may be determined by equipping them with additional mobile transponders. The orientation of the neighbouring objects NB1, NB2, NB3 may either be determined from a priori knowledge or using inertial or inertial/magnetic measurement units.

The step of selecting Et_Sel enables to exclude from the position calculation base stations whose measurements are corrupted by multipath or non-line-of-sight errors. Then, the method METH comprises a step of calculating Et_Cal an actual position AcPos of the object of interest OI, using time of arrival or time difference of arrival measurements between the base stations of the subset BS2-BS6 and the mobile transponder MT.

Of course, the present invention is not limited to the illustrated example but may be subject to various variants and alterations, which will be apparent to those skilled in the art.

The invention claimed is:

1. A method for calculating a position of an object of interest in an environment, the method comprising:
    predicting a position and an orientation of the object of interest in the environment;
    selecting a subset of base stations among a set of base stations located within the environment, by using the predicted position and orientation, and a radiation pattern of a system comprising the object of interest and a mobile transponder attached to the object of interest, the selecting comprising determining whether the base stations of the set could receive line-of-sight signals from the mobile transponder if the object of interest had the predicted position and orientation in the environment;
    calculating an actual position of the object of interest, using time of arrival or time difference of arrival measurements between the base stations of the subset and the mobile transponder.

2. The method according to claim 1, wherein the determining comprises assessing a position of at least one other object of the environment, as a neighbouring object.

3. The method according to claim 1, wherein the selecting comprises, for a given signal transmitted by the mobile transponder:
    estimating signal strengths expected at the base stations of the set, if the object of interest had the predicted position and orientation; and
    comparing measured signal strengths at the base stations of the set with the estimated signal strengths.

4. The method according to claim 1, wherein the prediction of the position is performed by using a previous position of the object of interest in the environment.

5. The method according to claim 1, wherein the object of interest is moving along a predefined path, and the prediction of the orientation is performed by using geographical features of the path, a previous position of the object of interest on the path, and a direction of the object of interest along the path.

6. The method according to claim 1, wherein the predictions of the position and orientation are performed by using of a motion model and a previous position and orientation of the object of interest in the environment.

7. The method according to claim 1, wherein the prediction of the orientation is performed by using inertial and magnetic measurements.

* * * * *